(12) United States Patent
Iaconis et al.

(10) Patent No.: US 7,992,599 B2
(45) Date of Patent: Aug. 9, 2011

(54) REFUELING STATION

(75) Inventors: Jean-Louis Iaconis, Vancouver (CA);
Joerg Zimmermann, Vancouver (CA);
Duhane Lam, Vancouver (CA)

(73) Assignee: Angstrom Power Incorporated, North Vancouver (VG)

( * ) Notice: Subject to any disclaimer, the term of this patent is extended or adjusted under 35 U.S.C. 154(b) by 1100 days.

(21) Appl. No.: 11/535,052

(22) Filed: Sep. 25, 2006

(65) Prior Publication Data

US 2007/0068599 A1 Mar. 29, 2007

Related U.S. Application Data

(60) Provisional application No. 60/719,604, filed on Sep. 23, 2005.

(51) Int. Cl.
*B65B 1/04* (2006.01)

(52) U.S. Cl. .............. 141/18; 141/3; 141/237; 141/351; 141/367; 141/378

(58) Field of Classification Search .................. 141/2, 3, 141/18, 20, 234–237, 242–244, 311 R, 312, 141/318, 346, 348, 349, 351, 378, 367
See application file for complete search history.

(56) References Cited

U.S. PATENT DOCUMENTS

| | | | |
|---|---|---|---|
| 3,574,314 A * | 4/1971 | Quercia | 141/349 |
| 3,592,244 A * | 7/1971 | Chamberlin | 141/14 |
| 5,343,904 A * | 9/1994 | Kaeser | 141/20 |
| 5,345,980 A * | 9/1994 | Burt et al. | 141/3 |
| 6,334,469 B1 | 1/2002 | Taniguchi | |
| 6,571,834 B2 | 6/2003 | Takeda et al. | |
| 6,609,381 B1 * | 8/2003 | Morgan | 62/50.1 |
| 7,093,623 B2 * | 8/2006 | Soucy | 141/2 |
| 7,169,489 B2 * | 1/2007 | Redmond | 429/12 |
| 7,537,024 B2 * | 5/2009 | Adams et al. | 137/614.04 |
| 2004/0016769 A1 * | 1/2004 | Redmond | 222/3 |
| 2004/0146769 A1 * | 7/2004 | Birschbach | 429/34 |
| 2004/0205032 A1 | 10/2004 | Routtenberg et al. | |
| 2005/0067047 A1 * | 3/2005 | Williamson | 141/39 |
| 2005/0115637 A1 * | 6/2005 | Adams et al. | 141/351 |

* cited by examiner

*Primary Examiner* — Gregory Huson
*Assistant Examiner* — Jason Niesz
(74) *Attorney, Agent, or Firm* — Schwegman, Lundberg & Woessner, P.A.

(57) ABSTRACT

An apparatus for fueling a fuel-cell-powered device having a profile and a fuel inlet. The apparatus comprises at least one fuel port having an outlet and at least one adaptor associated with the fuel port. The adaptor is configured to receive the fuel-cell-powered device. Means for releasably and sealingly engaging the fuel inlet of the fuel-cell-powered device to the outlet of the fuel port are also provided. The outlet of the fuel port is operative to dispense fuel when it is in sealed engagement with the fuel inlet of the fuel-cell-powered device.

24 Claims, 10 Drawing Sheets

REFUELING STATION

CROSS-REFERENCE TO RELATED APPLICATION

This application claims the benefit under 35 U.S.C. §119 of U.S. application No. 60/719,604 filed on 23 Sep. 2005 which is hereby incorporated herein by reference.

TECHNICAL FIELD

This invention relates to fuel-cell-powered portable devices, and in particular to methods and apparatus for fueling fuel-cell-powered portable devices.

BACKGROUND

A fuel cell is a device that converts a fuel into electricity through an electrochemical reaction. Fuel cells have applicability in a wide range of stationary and portable applications. Fuel cells vary in capacity and size. Some fuel cells are small and portable. Other fuel cell systems are very complicated plants that produce relatively large amounts of electrical power.

Fuel cells need fuel and an oxidant to operate. The fuel cell can run as long as fuel and an oxidant are supplied to the fuel cell. Fuel cells can be designed to operate using a wide range of fuels such as hydrogen, methanol, butane, formic acid, and borohydride compounds. Since fuels is consumed as a fuel cell operates to generate electrical power, a fuel-cell-powered device requires a refueling mechanism. Some fuel-cell-powered devices have refillable fuel cartridges. Other fuel-cell-powered devices have built-in on-board fuel storage reservoirs.

SUMMARY

There is a need for a refueling system capable of refueling fuel-cell-powered devices that use gaseous fuels such as hydrogen. A need also exists for refueling systems that can be readily adapted to refuel a variety of portable devices. A need also exists for refueling systems that can operate either connected to an external fuel source or from a source of fuel located on board the refueling system. A need also exists for refueling systems that are easy to use and do not require connections to an external power source to run.

Aspects of the invention provide refueling systems that address one or more of these needs. Refueling systems may be used for refueling a variety of fuel cell devices including, for example, fuel cell cartridges and portable fuel cell-powered devices that have on-board fuel reservoirs or external fuel cartridges. Fuel cell cartridges include, for example, satellite cartridges that may themselves be used to refuel portable devices and small portable fuel cartridges that may be integrated with or removably mounted in portable devices.

One aspect of the invention provides an apparatus for fueling a fuel cell device having a profile and a fuel inlet. The apparatus comprising at least one fuel port having an outlet and at least one adaptor adjacent to each fuel port. The adaptor has a recess shaped to receive the profile of the fuel cell device. Means for releasably and sealingly engaging the fuel inlet of the fuel cell device to the outlet of the fuel port are also provided. The outlet of the fuel port is operative to dispense fuel when it is in sealed fluid communication with the fuel inlet of the fuel cell device.

Another aspect of the invention provides a method of fueling a fuel cell device having a profile and a fuel inlet, the method comprising: providing a fuel source; providing an apparatus comprising at least one fuel port having an outlet and at least one adaptor having a recess shaped to receive the profile of the fuel cell device; releasably and sealingly engaging the outlet of the fuel port with the fuel inlet of the fuel cell device; allowing fuel to flow from the at least one fuel port to the fuel cell device; and removing the fuel cell device from the fuel port to stop the flow of fuel to the fuel cell device.

A further aspect of the invention provides refueling systems that can operate independently of any external fuel or electricity sources. Some such refueling systems can operate in both portable or stationary modes. Such refueling systems may have interchangeable refueling adaptors. This provides the flexibility to refuel a wide variety of devices of varying profiles, and the ability to interchange refueling adaptors without shutting down the system.

Yet another aspect of the invention provides refueling systems having an onboard compressed gas reservoir to facilitate both stationary and portable operation. Such a refueling system may have a modular system of fuel ports and refueling adaptors so that the system can be easily adapted to refuel a wide variety of devices.

BRIEF DESCRIPTION OF THE DRAWINGS

In drawings which illustrate non-limiting embodiments of the invention.

DESCRIPTION

Figure 1A:
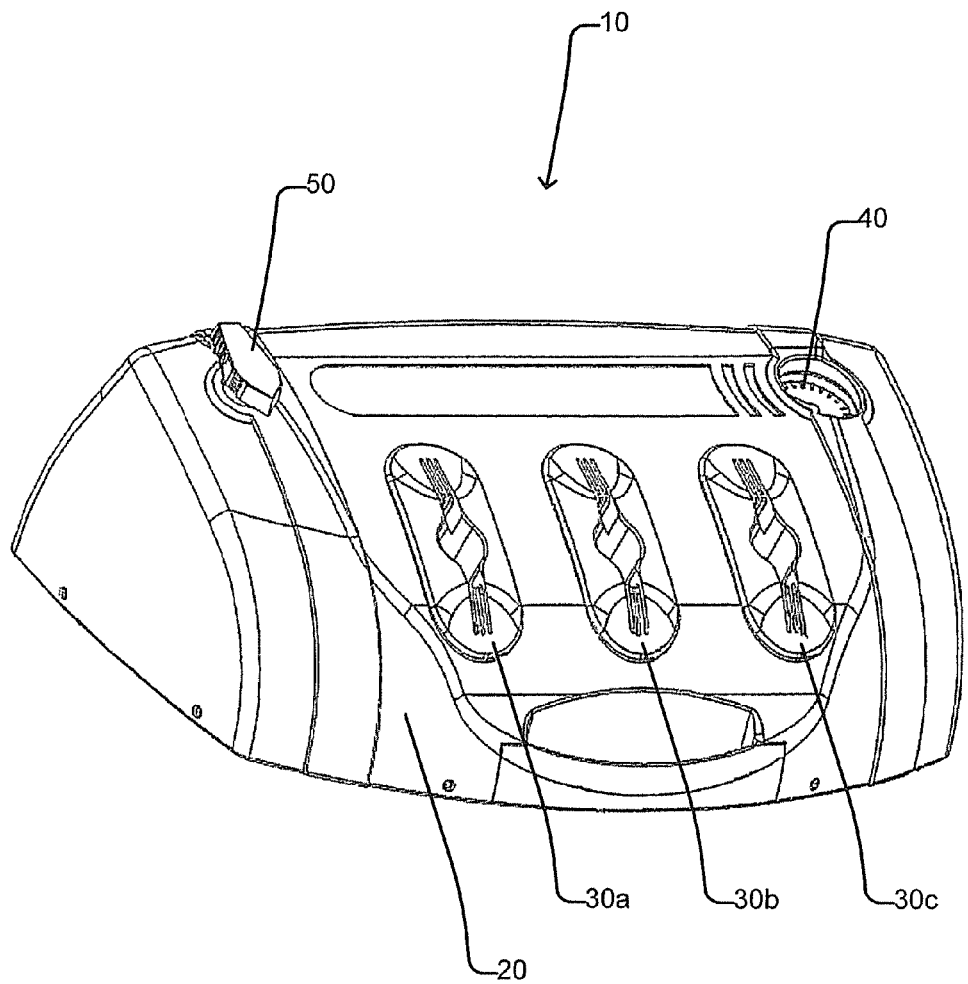
FIGS. 1A and 1B show front and rear isometric views of a refueling station according to an example embodiment of the invention.
Figure 1B:
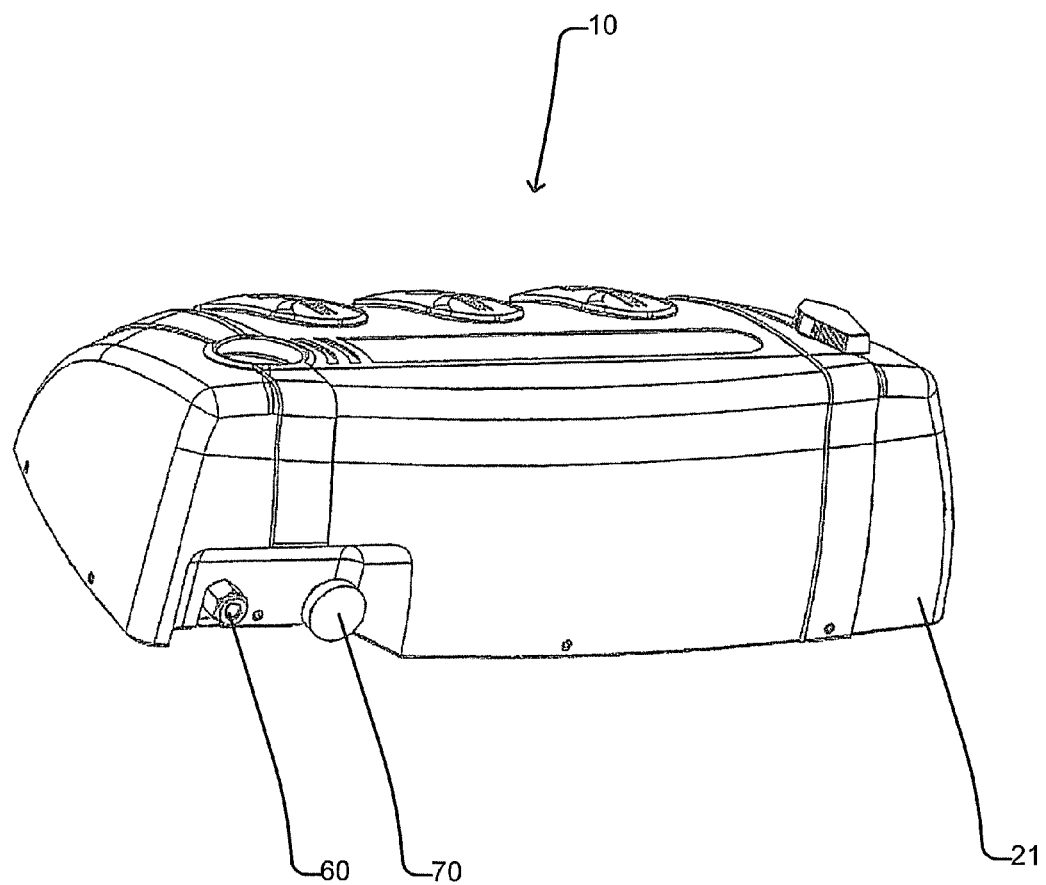

FIGS. 1A and 1B show a refueling system 10 for refueling fuel-cell-powered devices according to one embodiment of the invention. Refueling system 10 may be configured to deliver fuel to: fuel-cell-powered devices having on-board fuel reservoirs (which may be integrated or removable) and/or cartridges for storing fuel for use by fuel-cell-powered devices. Delivering fuel to a fuel reservoir while the reservoir is integrated with a fuel-cell-powered device and delivering fuel to a cartridge to be connected to a fuel-cell-powered device are both examples of fueling a fuel-cell-powered device.

Refueling system 10 may comprise: an enclosure 20, a plurality of interchangeable refueling port adaptors 30a, 30b, 30c (collectively refueling port adaptors 30), a refueling pressure indicator 40, and a fuel shutoff valve 50. An optional external fuel supply port 60 and an external port shutoff valve 70 for isolating the external port 60 when not in use may be provided on refueling system 10.

Enclosure 20 may be made of any suitable material, for example, a plastic, metallic, or composite material, or combinations thereof. External fuel supply port 60 may comprise, for example, a commercially-available threaded connector, a locking connector or another connector configured to connect to an available external source of fuel.

Figure 2A:
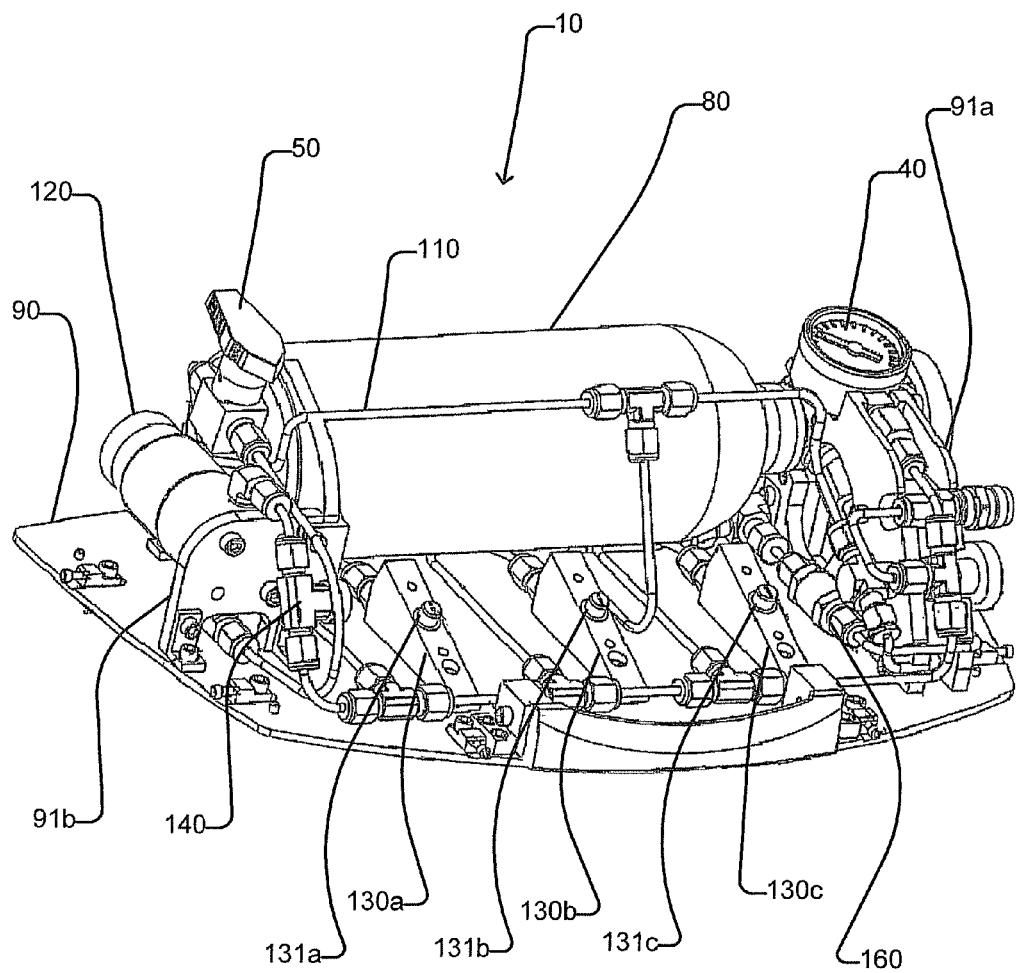
FIGS. 2A and 2B show front and rear isometric views of internal components of the refueling station of FIGS. 1A and 1B.
Figure 2B:
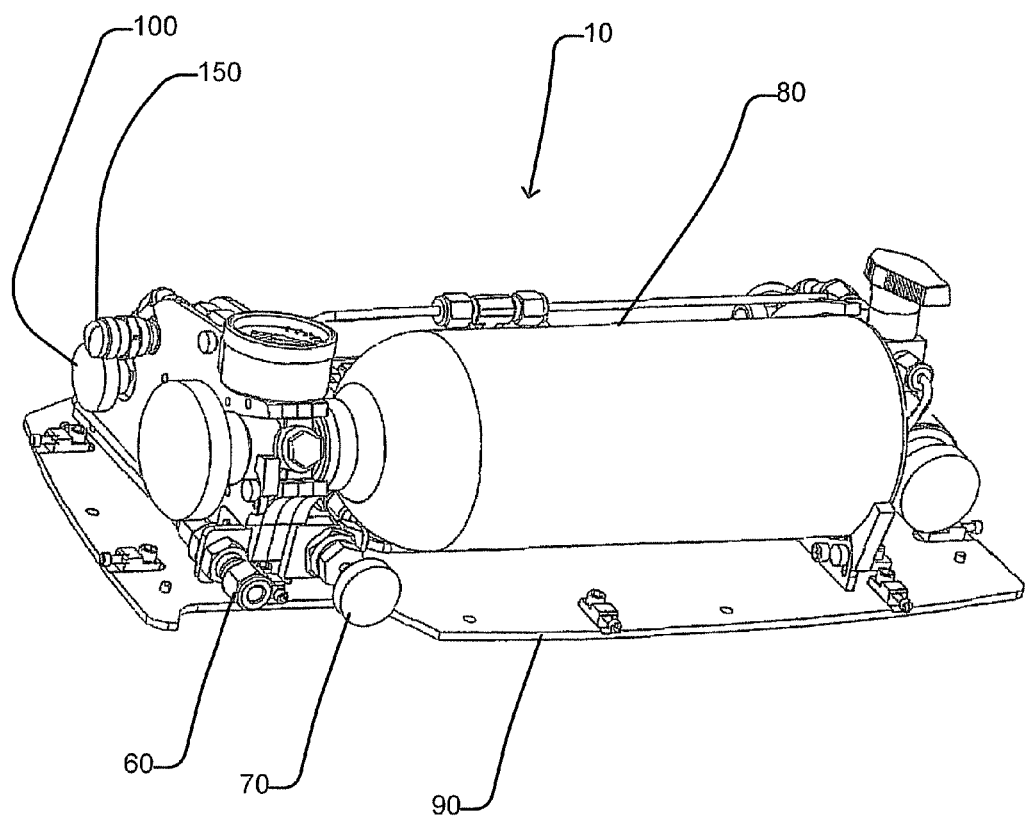

FIGS. 2A and 2B show a refueling system 10 according to one specific embodiment of the invention. The illustrated refueling system 10 has a fuel storage cylinder 80 housed within enclosure 20. Fuel storage cylinder is accessible through a removable panel 21 (see FIG. 1B). Fuel storage cylinder 80 is supported in enclosure 20. For example, cylinder 80 may be mechanically constrained to a base plate 90 via a plurality of brackets 91a, 91b (collectively brackets 91) protruding from the base plate 90. Brackets 91 may either be distinct components that are, for example, mechanically fastened, welded, brazed, or bonded to base plate 90, or integral to the base plate 90 such as in the case of a molded plastic part, a cast metal part or combinations thereof. Fuel storage cylinder 80 may be replenished by (1) replacing fuel storage cylinder 80, (2) removing and refilling fuel storage cylinder 80, or (3) refilling storage cylinder 80 in-situ.

An internal port shutoff valve 100 for isolating onboard fuel storage cylinder 80 when not in use or not present is directly connected to the onboard fuel storage cylinder 80. Downstream of internal port shutoff valve 100, a fuel manifold 110 fluidically connects internal port shutoff valve 100 to a pressure regulator 120 that sets the refueling pressure. A flow rate regulator (not shown) may also be provided upstream or downstream of pressure regulator 120. Downstream of pressure regulator 120, fuel manifold 110 branches into at least one universal refueling ports 130a, 130b, and 130c (collectively universal refueling ports 130). External fuel supply port 60 fluidically connects to fuel manifold 110 downstream of internal port shutoff valve 100 and upstream of pressure regulator 120.

Pressure regulator 120 (and the flow rate regulator, if present) may be configured to either adjust the pressures and flow rates of fuel dispensed from each universal refueling port 130 together or independently. In the illustrated embodiment, independent adjustment permits refueling system 10 to simultaneously refuel up to three fuel cell devices each having different fuel pressure and/or flow rate requirements.

The number of universal refueling ports 130 provided by a refueling system 10 may be varied. An embodiment having only one universal refueling port is described below. Other embodiments may have four or more universal refueling ports to permit simultaneous refueling of four or more fuel-cell-powered devices and/or fuel cartridges for fuel-cell-powered devices.

Each universal refueling port 130 comprises an integral check valve 131, which automatically seals the universal refueling port 130 when not in use, as illustrated in FIG. 2A. Each universal refueling port 130 may be adapted to refuel any of a broad array of devices by installing an appropriate refueling port adaptor 30 to universal refueling port 130.

Each refueling port adaptor 30 is configured to receive a specific type of device for refueling. In the illustrated embodiment, each adapter 30 defines a receptacle that has a cross-section shaped to accept devices having a given cross-sectional profile. The device profile specificity of refueling port adaptors 30 therefore safeguards against the wrong type of fuel cell device being inadvertently inserted into refueling system 10. Refueling port adaptors 30 may be releasably held in place in refueling system 10 by, for example, a frictional-fit, magnetic, snap-fit/release, or latch mechanism and the like. Releasable fastening facilitates interchanging refueling port adaptors 30.

Each refueling port adaptor 30 may comprise a mechanism for constraining the device being refueled. Constraint mechanisms include, for example, a threaded mechanism, a friction-fit mechanism, magnetic mechanism, snap-fit/release mechanism, latches and the like.

FIGS. 7A through 7D show details of construction of a fuel port 602 of an example portable device 600 and a corresponding example refueling port adaptor 630 that receives portable device 600 in a receptacle 634. Receptacle 634 is shaped to accept portable device 600. As portable device 600 is inserted into receptacle 634, fuel port 602 engages a fuel connector 636 of adaptor 630. Fuel port 602 includes a seal 604 that seals to connector 636 before portable device 600 is fully inserted into receptacle 634.

Refueling port adaptors 30 may also comprise an actuator member, such as a pin or the like that is moved by a device when the device is being inserted into the refueling port adaptor 30. In the embodiment illustrated in FIGS. 7A to 7D, actuator member 638 comprises a pin which is depressed by the introduction of a device 600 to be fueled. An actuator member (such as pin 638) may be operatively connected to a check valve such that when the actuator member is depressed, the check valve opens, allowing fuel to flow into the device being refueled.

Figure 7A:
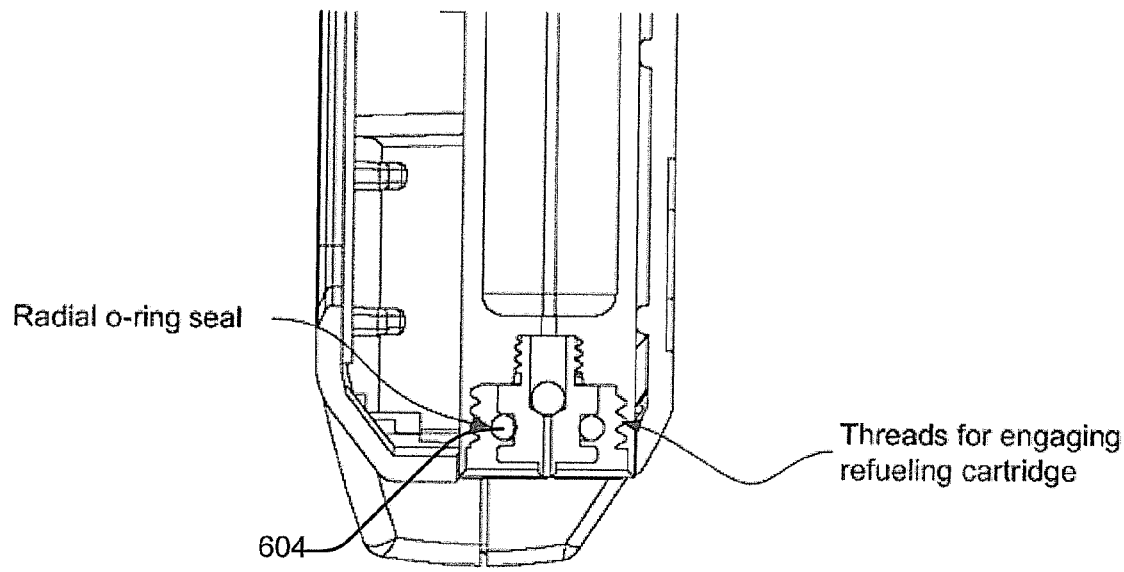
FIG. 7A shows a refueling port for an example portable device.
Figure 7B:
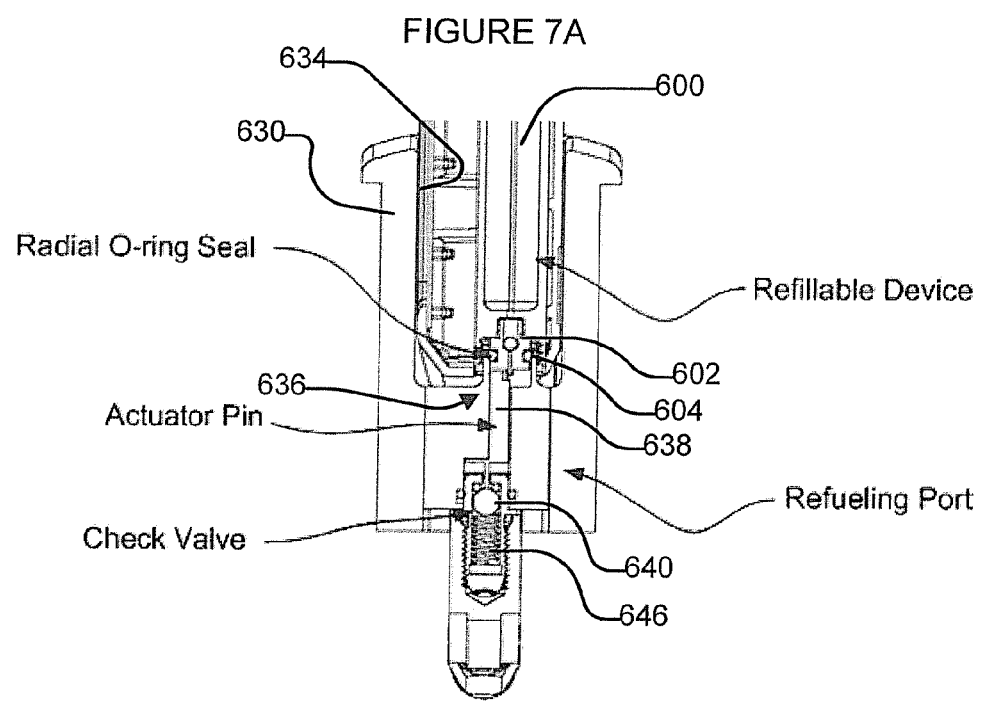
FIG. 7B shows the refueling port of FIG. 7A connected to an adaptor in a refueling station; and, FIGS. 7C and 7D illustrate the operation of an example fluid coupling for providing fluid communication between a portable device and a refueling station.
Figure 7D:
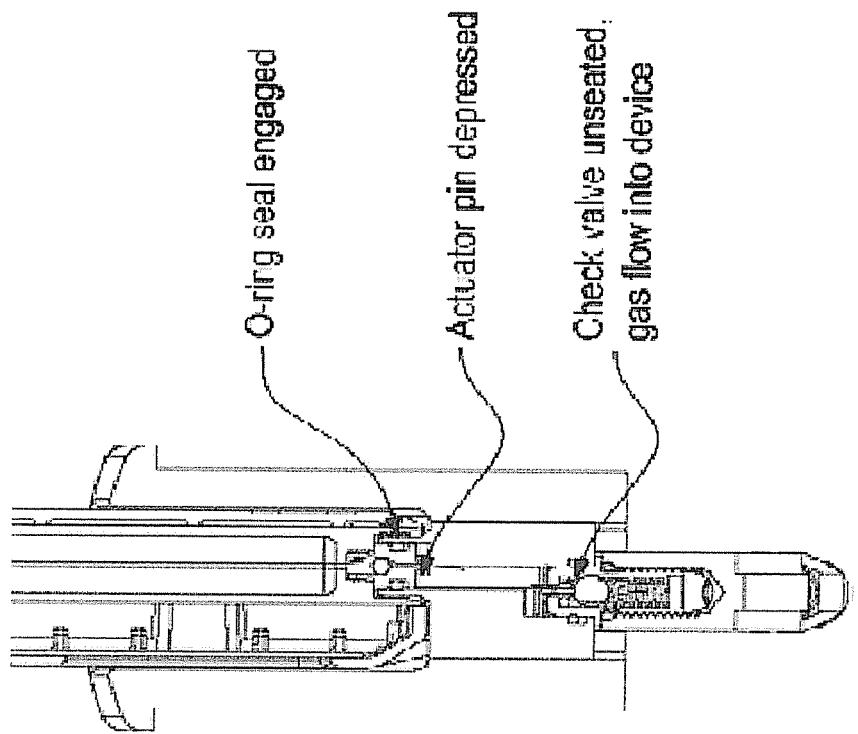
Figure 7C:
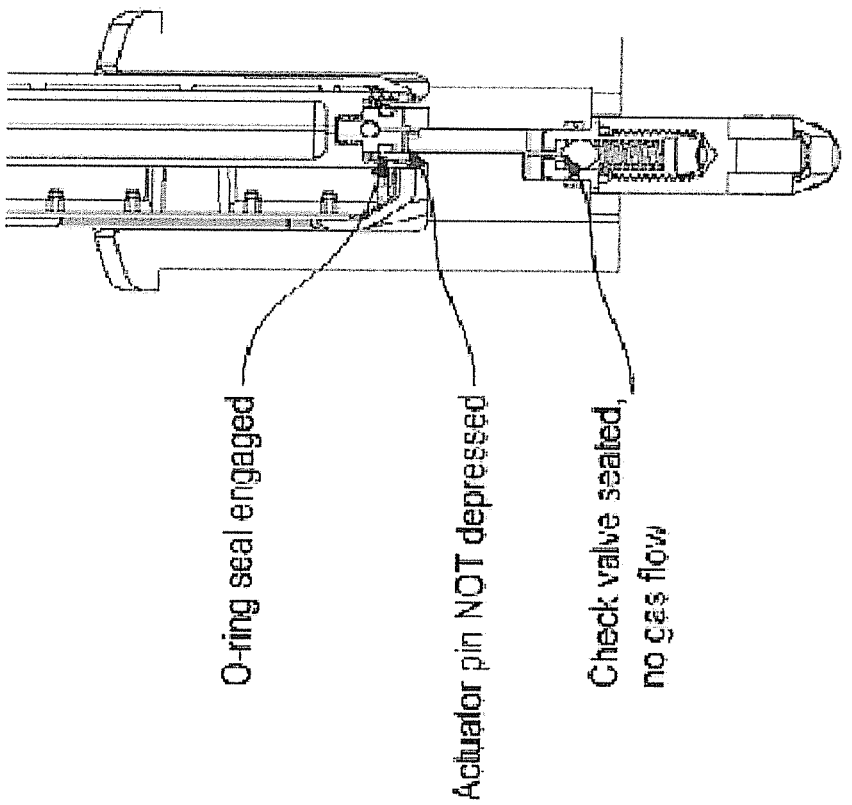

In the embodiment illustrated in FIGS. 7B to 7D, as portable device 600 is pushed the last part of the way into receptacle 634, fuel port 602 displaces actuator pin 638 which, in turn, opens check valve 640 against the pressure exerted by spring 646 and any differential gas pressure across check valve 640. When portable device 600 is removed from receptacle 634, check valve 640 closes before the seal between fuel port 602 and connector 636 is broken. As shown in FIG. 7C when device 600 has been removed from refueling port adaptor 630, actuator pin 638 is no longer depressed and check valve 640 has been returned to its closed position during removal of device 600. Check valve 640 prevents further fuel discharge.

A pressure relief valve 140, a purge valve 150, and a refueling pressure indicator 40 may also be disposed along the fuel manifold 110 to which the universal refueling ports 130 are connected. Pressure relief valve 140 guards the system against pressure surges. Purge valve 150 can be used for expelling any trapped air that may be present in fuel manifold 110 when the system is first pressurized. Refueling pressure indicator 40 is visible from outside the refueling system enclosure 20 and provides the user with a visual indication of the system's current refueling pressure. Fuel shutoff valve 50, which is accessible from outside the refueling system enclosure 20, is also connected to fuel manifold 110 either upstream or downstream of pressure regulator 120.

External fuel supply port 60 connects to fuel manifold 110 immediately downstream of the internal port shutoff valve 100. External fuel supply port 60 is firmly supported. For example, it may be attached to base plate 90 or to at least one of brackets 91 extending from base plate 90. Directly connected to, or integral with, external fuel supply port 60 is a check valve 160, which is oriented to allow flow into the refueling system 10, but to prevent any fuel discharge from the external fuel supply port 60. Downstream of check valve 160 is external port shutoff valve 70, which may be used to isolate the external fuel supply port 60.

External port shutoff valve 70 then merges with fuel manifold 110 downstream of the internal port shutoff valve 100.

This arrangement of internal (100) and external (70) port shutoff valves facilitates two discrete refueling system 10 operating modes:

Portable Operation: In portable operation mode, refueling system 10 can be used as a self-contained fuel source to refuel devices using fuel stored in its fuel storage cylinder 80. This operating mode requires no external fuel source or grid electricity. This facilitates operation in remote areas while providing portability.

Stationary Operation: In stationary operation mode refueling system 10 may optionally be connected to an external fuel source such as a compressed gas cylinder or fuel supply line, such as typically available in industrial or laboratory environments, via external fuel supply port 60. Such operation negates the need to periodically replace or refill fuel storage cylinder 80. In some embodiments, onboard fuel storage cylinder 80 may be refilled from the external fuel source. In cases where a suitable external fuel source is available, cylinder 80 is not required for stationary operation and may be absent.

Figure 3:
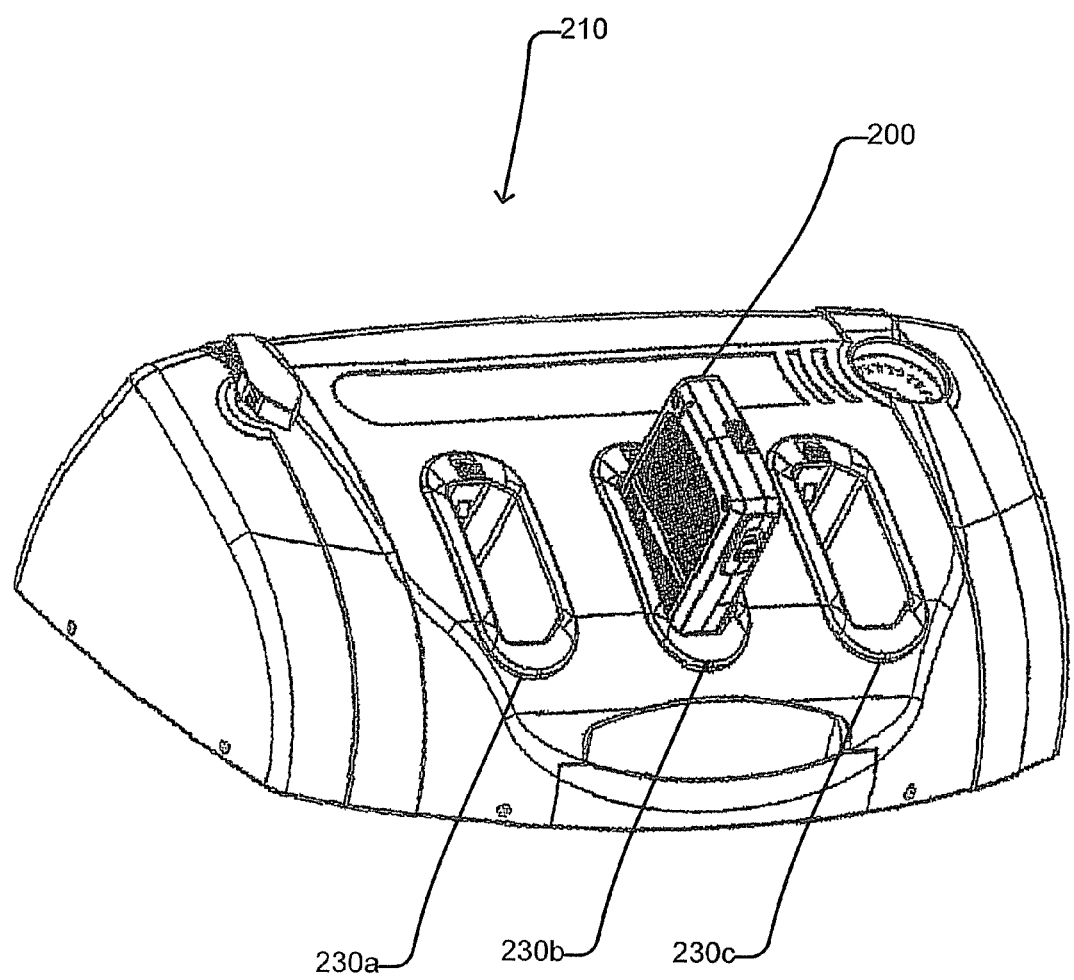
FIG. 3 shows a front isometric view of a refueling station according to another embodiment of the invention.

FIGS. 3, 4, 5A, 5B, 6A and 6B show refueling systems according to alternative embodiments of the invention. FIG. 3 shows a refueling system 210, having several identical refueling adaptors 230a, 230b, and 230c. A fuel cell device 200 is shown inserted into adaptor 230b. Such a refueling system could be used to refuel a number of portable devices simultaneously.

Figure 4:
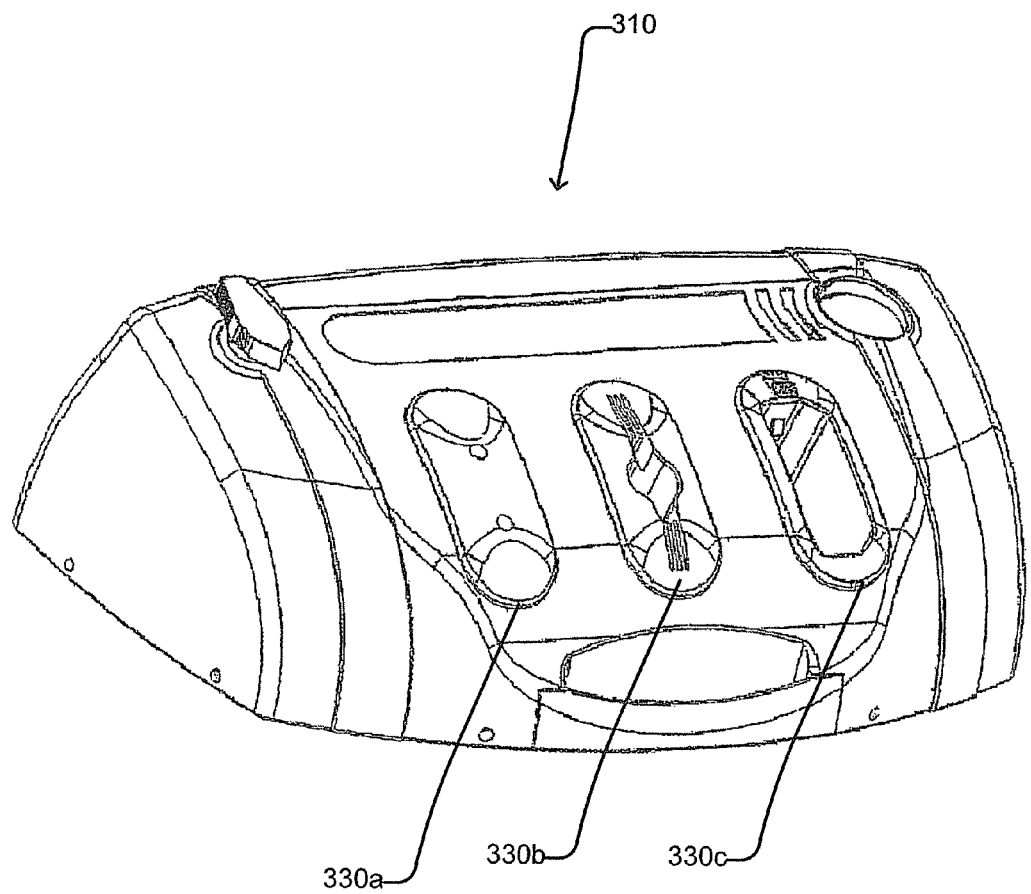
FIG. 4 shows a front isometric view of a refueling station according to another embodiment of the invention.

FIG. 4 shows another refueling system 310 having three different refueling port adaptors 330a, 330b and 330c for connection to three different types of fuel cell devices.

Figures 5A, 5B:
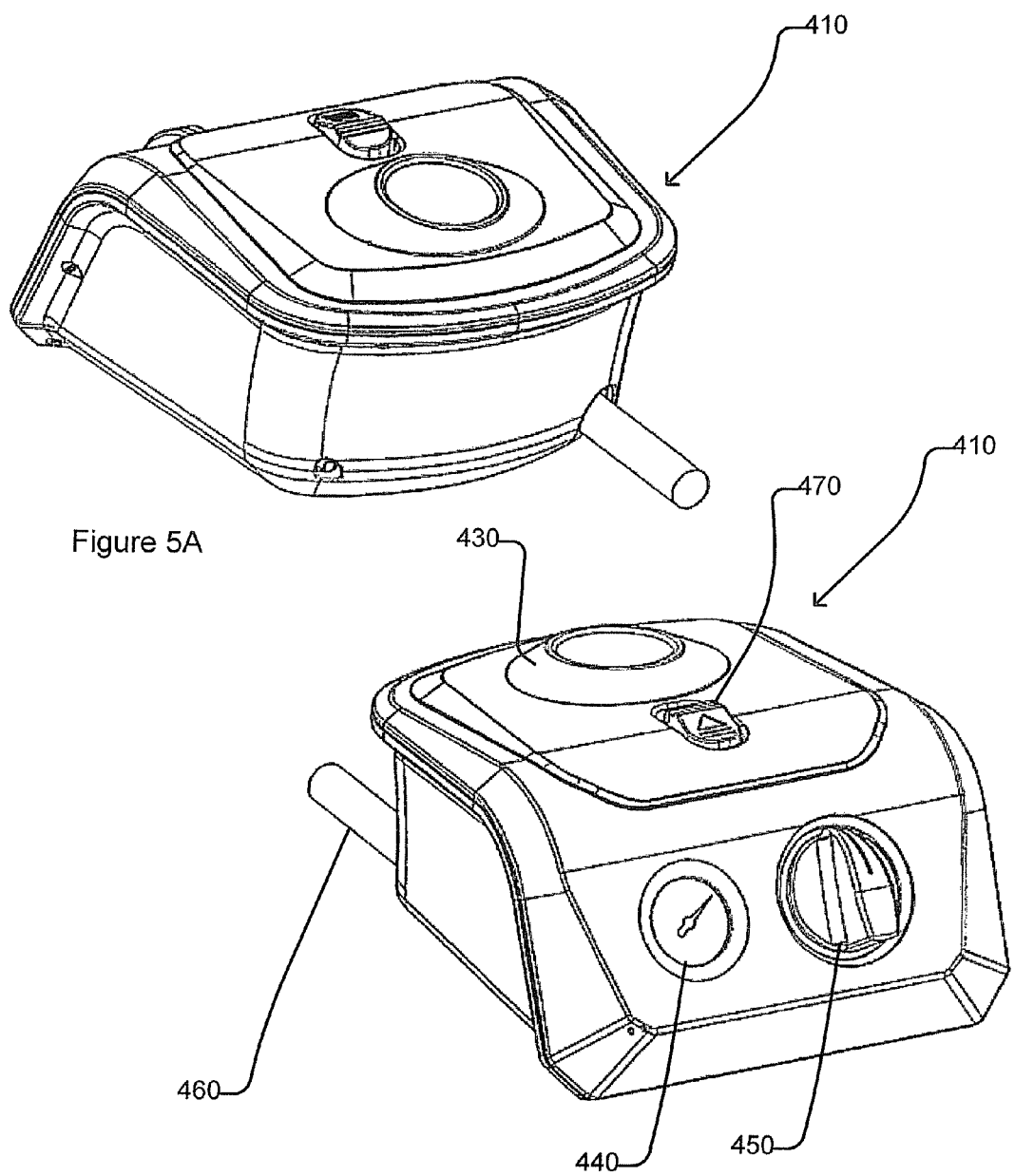
FIGS. 5A and 5B show front and rear isometric views of a refueling station another embodiment of the invention.

FIGS. 5A and 5B show a refueling system 410 having one refueling adaptor 430 adapted to fit a single type of device (not shown) such as a fuel-cell powered flashlight. Refueling system 410 has an external fuel supply port 460, refueling pressure indicator 440, and an on/off switch 450. Release mechanism 470 indicates to the user when the device has been properly inserted into refueling adaptor 430, for example, by making a clicking sound or changing its visual appearance (such as by visibly sliding, depressing, popping up, or otherwise moving). Release mechanism 470 may be depressed or otherwise operated to release the device from refueling adaptor 430.

In addition to the illustrated components, refueling system 410 may comprise a pressure regulator for regulating hydrogen delivery pressure; a pressure relief valve for preventing system overpressure; a filter/flow control element for regulating hydrogen delivery flowrate; and a purge valve for preventing hydride poisoning by contaminant gases.

Externally, the illustrated refueling system 410 has minimal controls to avoid the potential for operator error.

Figures 6A, 6B:
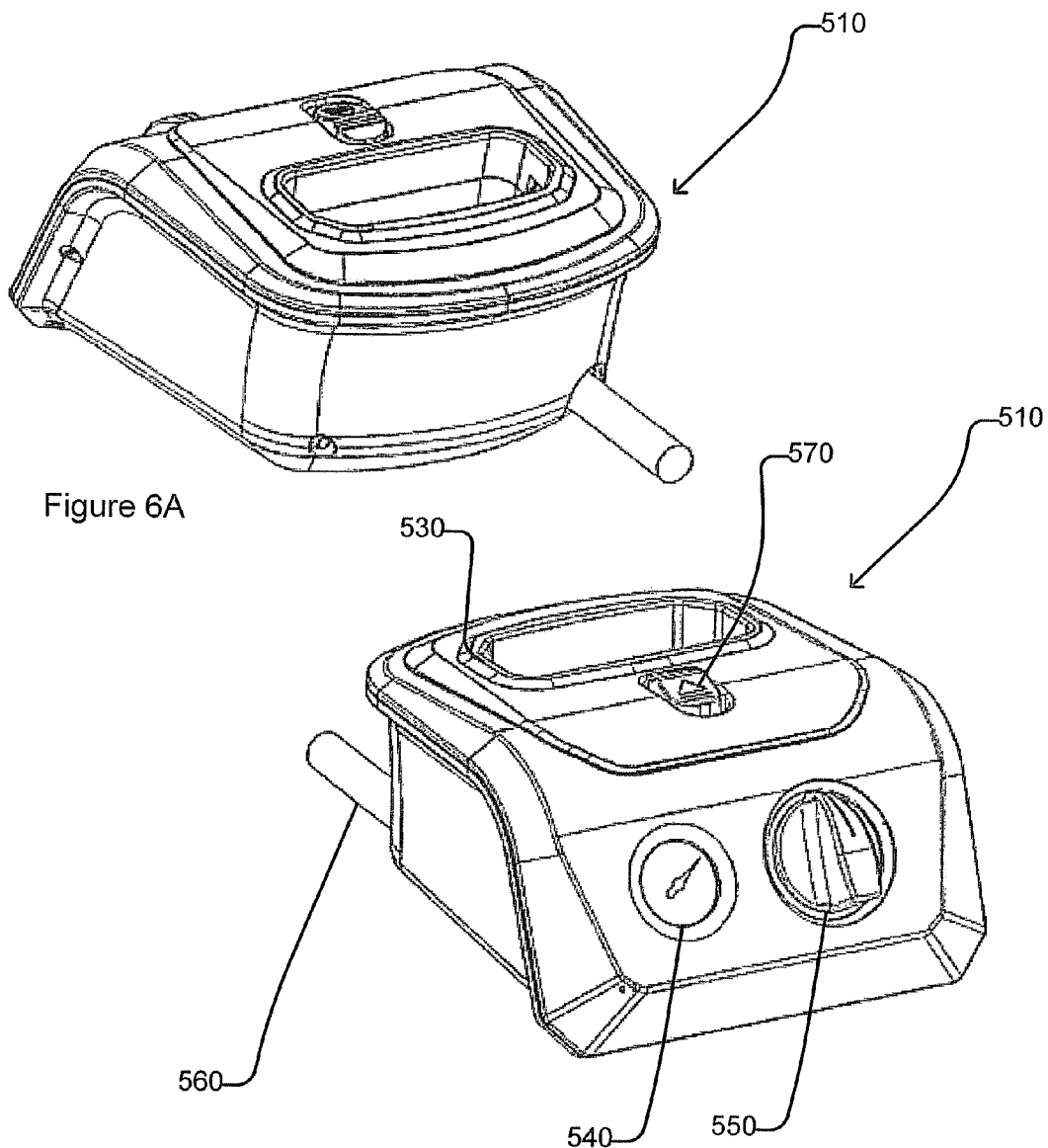
FIGS. 6A and 6B show front and rear isometric views of a refueling station according to another embodiment of the invention.

FIGS. 6A and 6B show a refueling system 510 having one refueling adaptor 530 adapted to fit a portable fuel cell cartridge (not shown). Similar to refueling system 410, refueling system 510 also has an external fuel supply port 560, refueling pressure indicator 540 and an on/off switch 550. Release mechanism 570 indicates to the user when the portable fuel cell cartridge has been properly inserted into refueling adaptor 530. Depressing release mechanism 570 releases the portable fuel cell cartridge from refueling adaptor 530.

In some embodiments, adaptors for refueling specific types of portable device include pressure regulators, flow regulators, or means for controlling a pressure regulator or flow regulator of a refueling station to supply hydrogen or other fuel under conditions of flow, pressure or the like that are suitable for the portable devices to be refueled.

Refueling systems according to the embodiments described above can be adapted to refuel new types of portable devices by installing a new adaptor 30 that is compatible with the new type of portable device. Further, in the illustrated embodiments refueling is driven entirely by the pressure of fuel in the refilling system. Fuel gas flow commences when a device is inserted and ceases when the device is removed, without any user intervention or electrical controls.

While a number of exemplary aspects and embodiments have been discussed above, those of skill in the art will recognize certain modifications, permutations, additions and sub-combinations thereof. It is therefore intended that all such modifications, permutations, additions and sub-combinations be considered to be part of this invention.

What is claimed is:

1. An apparatus for fueling at least three fuel-cell-powered devices, each device having a profile and a fuel inlet, the apparatus comprising:
    a housing defining at least three device adaptor recesses, each device adaptor recess configured for accepting a device adaptor;
    at least three fuel ports, each of the ports having an outlet;
    at least three device adaptors each configured to fit within any of the three device adaptor recesses, including a first device adaptor, a second device adaptor and a third device adaptor, wherein each of the first, second, and third device adaptors are adjacent to one of the fuel ports and include a device recess for receiving a body of one of the devices, wherein the device recess of the first device adaptor has a shape that is disparate from the shape of the device recesses of the second and third device adaptors;
    at least three seals, each seal disposed to releasably establish a sealed fluidic connection between the fuel inlet of one of the devices and the outlet of one of the fuel ports;
    wherein each of the fuel ports are operative to dispense fuel when the inlet of the fuel-cell-powered device is in sealed engagement with the outlet of the at least one fuel port.

2. An apparatus according to claim 1 wherein each device adaptor includes a mechanism for constraining a device.

3. An apparatus according to claim 1 comprising an onboard fuel source in fluid connection with the at least one fuel port.

4. An apparatus according to claim 1 comprising an external fuel source in fluid connection with the at least one fuel port.

5. An apparatus according to claim 1 wherein the at least one fuel port comprises a check valve, whereby fuel can be dispensed when the check valve is open and fuel is not dispensed when the check valve is closed.

6. An apparatus according to claim 5 wherein the at least one device adaptor comprises an actuator operably connected to the check valve and moveable between an engaged position causing the check valve to open, and a released position causing the check valve to close, whereby when the profile of the fuel-cell-powered device is fully received within the device recess of the at least one device adaptor the actuator moves to the engaged position, and when the profile of the fuel-cell-powered device is no longer fully received within the device recess of the at least one device adaptor the actuator moves to the released position.

7. An apparatus according to claim 1 comprising a purge valve connected upstream from one of the fuel ports.

8. An apparatus according to claim 1 comprising a pressure relief device configured to open to relieve pressure within the apparatus when the pressure within the apparatus reaches or exceeds a threshold pressure.

9. An apparatus according to claim 1 comprising a fuel pressure regulator.

10. An apparatus according to claim 1 wherein the apparatus is portable.

11. An apparatus according to claim 1 wherein the fuel is a gas.

12. An apparatus according to claim 11 wherein the fuel is hydrogen.

13. A method of fueling a fuel-cell-powered device having a profile and a fuel inlet, the method comprising:
   providing a fuel source;
   providing an apparatus including
      a housing defining at least three adaptor recesses, each adaptor recess configured for accepting a device adaptor;
      at least three fuel ports, each of the ports having an outlet and
      at least three device adaptors each configured to fit within any of the three device adaptor recesses, including a first device adaptor, a second device adaptor and a third device adaptor, wherein each of the first, second, and third device adaptors are adjacent to one of the fuel ports and include a device recess for receiving a body of a fuel-cell-powered device,
   wherein the device recesses of the first adaptor has a shape that is disparate from the shape of the device recesses of the second and third adaptors;
   releasably and sealingly engaging the outlet of one of the fuel ports with the fuel inlet of a first fuel-cell-powered device; and
   allowing fuel to flow from the engaged fuel port to the fuel-cell-powered device.

14. The method of claim 13 further comprising releasably and sealingly engaging a second fuel-cell-powered device to one of the fuel ports, the second fuel-cell-powered device having a body with a profile that is disparate from the profile of the body of the first fuel-cell-powered device.

15. The method of claim 14 further comprising releasably and sealing engaging a third fuel-cell-powered device to one of the fuel ports, the third fuel-cell-powered device having a body profile that is disparate from the profiles of either the bodies of the first fuel-cell-powered device or the second fuel-cell-powered device.

16. The method of claim 13 wherein each device adaptor includes a constraining mechanism adapted for constraining a fuel-cell-powered device while it is being refueled.

17. The method of claim 13 wherein each device adaptor includes an actuator.

18. The method of claim 13 wherein each of the at least three adaptors can be releasably fastened within any of the at least three adaptor recesses.

19. The apparatus of claim 1 wherein each of the at least three adaptors can be releasably fastened within any of the at least three adaptor recesses.

20. A refueling system for fueling fuel-cell-powered devices, the system comprising:
   a housing defining at least two adaptor recesses, each adaptor recess configured for accepting a device adaptor;
   at least two refueling ports, each of the ports include an outlet;
   a first device adaptor and a second device adaptor, wherein each of the first and second device adaptors are configured to be releasably held in either of the two adaptor recesses and wherein each of the first and second device adaptors define a device receptacle having a cross-section shaped to accept a fuel-cell-powered device and wherein the shape of the cross-section of the device receptacle defined by the first device adaptor is disparate from the shape of the cross-section of the device receptacle defined by the second device adaptor.

21. The refueling system of claim 20, wherein the first and second device adaptors each include a mechanism for constraining the received fuel-cell-powered device.

22. The refueling system of claim 20, further comprising an on-board fuel source in fluid connection with the refueling port.

23. The refueling system of claim 20, wherein the first and second device adaptors each include an actuator and the refueling port includes a check valve, and wherein each actuator of the first and second device adaptors can be operably connected to the check valve and moveable between an engaged position causing the check valve to open and a released portion causing the check valve to close.

24. The refueling system of claim 20, further including a fuel cylinder housed within the housing and wherein the housing includes a removable panel that provides access for removing the fuel cylinder.

* * * * *